(12) United States Patent
Lynn et al.

(10) Patent No.: US 11,553,649 B2
(45) Date of Patent: Jan. 17, 2023

(54) CONVEYOR WITH SHOCK-ABSORBING BOOM

(71) Applicants: Levi Lynn, Pingree, ID (US); Tyson W Jensen, Firth, ID (US); Ryan Luttmer, Ammon, ID (US)

(72) Inventors: Levi Lynn, Pingree, ID (US); Tyson W Jensen, Firth, ID (US); Ryan Luttmer, Ammon, ID (US)

( * ) Notice: Subject to any disclaimer, the term of this patent is extended or adjusted under 35 U.S.C. 154(b) by 0 days.

(21) Appl. No.: 16/951,278

(22) Filed: Nov. 18, 2020

(65) Prior Publication Data

US 2022/0151155 A1 May 19, 2022

(51) Int. Cl.
*B65G 15/64* (2006.01)
*A01D 90/10* (2006.01)
*B65G 41/00* (2006.01)
*B65G 21/20* (2006.01)
*B65G 17/06* (2006.01)
*B65G 47/44* (2006.01)

(52) U.S. Cl.
CPC .......... *A01D 90/10* (2013.01); *B65G 17/064* (2013.01); *B65G 21/2081* (2013.01); *B65G 41/002* (2013.01); *B65G 41/007* (2013.01); *B65G 47/44* (2013.01)

(58) Field of Classification Search
CPC ..... B65G 15/64; B65G 41/002; B65G 41/005
USPC ........................................................ 198/319
See application file for complete search history.

(56) References Cited

U.S. PATENT DOCUMENTS

| | | | |
|---|---|---|---|
| 2,624,997 A | 1/1953 | Orendorff | |
| 2,782,943 A | 2/1957 | Jones et al. | |
| 2,793,731 A * | 5/1957 | Manierre | B65G 21/14 198/814 |
| 3,297,148 A * | 1/1967 | Andrews | B65G 65/22 198/304 |
| 3,340,935 A | 9/1967 | Csimma | |
| 3,750,858 A | 8/1973 | White | |
| 3,842,964 A * | 10/1974 | Kamner | B65G 37/00 198/861.2 |
| 3,850,283 A * | 11/1974 | Nordstrom | B64F 1/322 198/313 |
| 4,121,667 A | 10/1978 | Curl | |

(Continued)

FOREIGN PATENT DOCUMENTS

EP 2241175 10/2010

OTHER PUBLICATIONS

Dorner, 2200 Series Idea Guide, Product pamphlet, published at least as early as Apr. 29, 2020, pp. 1-20, Dorner Mfg. Corp., Hartland, WI, US.

(Continued)

*Primary Examiner* — Joseph A Dillon, Jr.
(74) *Attorney, Agent, or Firm* — Progress Patent Law, PLLC; David R. McKinney

(57) ABSTRACT

A shock-absorbing conveyor boom includes a proximal portion and a distal portion, hingedly connected to the proximal portion, the proximal and distal portions supporting a laterally flexible endless conveyor belt. The distal portion is pivotal in a generally horizontal plane, and is biased toward longitudinal alignment with the proximal portion, whereby physical shock applied to the distal portion can be absorbed by lateral deflection of the distal portion.

20 Claims, 8 Drawing Sheets

(56) References Cited

U.S. PATENT DOCUMENTS

| | | | | |
|---|---|---|---|---|
| 4,742,649 | A * | 5/1988 | Fuchs | B24B 21/18 |
| | | | | 474/135 |
| 5,103,623 | A | 4/1992 | Herrett | |
| 5,423,166 | A | 6/1995 | Scott | |
| 5,865,675 | A | 2/1999 | Meester | |
| 8,069,977 | B2 * | 12/2011 | Avery | B65G 21/02 |
| | | | | 198/861.2 |
| 8,147,176 | B2 | 4/2012 | Coers et al. | |
| 8,240,115 | B2 | 8/2012 | Marchini | |
| 8,428,829 | B2 | 4/2013 | Brunnert et al. | |
| 8,616,364 | B2 | 12/2013 | Priepke | |
| 8,893,871 | B1 * | 11/2014 | Peterson | B65G 41/002 |
| | | | | 193/22 |
| 9,002,591 | B2 | 4/2015 | Wang et al. | |
| 9,119,342 | B2 | 9/2015 | Bonefas | |
| 9,150,361 | B2 * | 10/2015 | Murphy | B65G 41/005 |
| 9,376,260 | B2 * | 6/2016 | Saarinen | B07B 1/005 |
| 9,399,915 | B2 * | 7/2016 | Hoffmann | B65G 15/28 |
| 9,655,301 | B2 | 5/2017 | Missotten et al. | |
| 9,719,218 | B2 * | 8/2017 | Lee | B65G 15/24 |
| 9,992,931 | B2 | 6/2018 | Bonefas et al. | |
| 10,023,389 | B1 | 7/2018 | Priepke et al. | |
| 10,143,140 | B2 | 12/2018 | Hirthammer | |
| 10,271,475 | B2 | 4/2019 | Dettmer et al. | |
| 11,021,327 | B2 * | 6/2021 | Porter | B65G 21/02 |
| 2011/0170995 | A1 * | 7/2011 | Yoder | A01D 41/1217 |
| | | | | 414/526 |
| 2014/0183003 | A1 * | 7/2014 | Jorgensen | B65G 41/008 |
| | | | | 198/602 |
| 2022/0053690 | A1 * | 2/2022 | Egan | A01D 57/20 |

OTHER PUBLICATIONS

Double L, Double L High-Capacity Potato Harvester, Double L website (https://www.doublelglobal.com/high-capacity-potato-harvester.php), downloaded at least as early as Apr. 29, 2020, pp. 1-20, Apache River LLC, Heyburn, ID, US.

Double L, Double L 7340 Features, Double L website (https://www.doublelglobal.com/high-capacity-potato-harvester.php), downloaded at least as early as Apr. 29, 2020, 1 pp., Apache River LLC, Heyburn, ID, US.

Suzhou Apollo, Customized Telescopic Conveyor Belt with Arm Swing, Alibaba website (https://www.alibaba.com/product-detail/Customized-Telescopic-Conveyor-Belt-with-Arm_60717481116.html), downloaded at least as early as Apr. 29, 2020, pp. 1-14, Suzhou Apollo Automation Equipment Co., Ltd., Jiangsu, China.

* cited by examiner

CONVEYOR WITH SHOCK-ABSORBING BOOM

BACKGROUND

Field of the Invention

The present disclosure relates generally to agricultural equipment. More particularly, this disclosure relates to a discharge conveyor for a harvester, having a shock-absorbing boom.

Related Art

In the course of harvesting various agricultural products, a harvester often includes an overhead boom that supports a discharge conveyor. The boom typically supports a conveyor belt that transports the products from the harvesting mechanism to the distal end of the boom for discharge into a truck or other receiving vehicle that moves along in the field beside the harvester.

During this operation, it is possible for the boom to be contacted by the receiving vehicle if the receiving vehicle and the harvester are not moving at the same speed. This can damage the harvester or cause other problems.

SUMMARY

It has been recognized that it would be advantageous to develop a harvester discharge boom that can withstand minor contact with a co-traveling vehicle or other object without being significantly damaged.

It has also been recognized that it would be advantageous to have a harvester discharge boom that can withstand minor contact with a co-traveling vehicle or other object without interruption of its operation.

In accordance with one aspect thereof, the present disclosure provides a discharge conveyor for a harvester. The discharge conveyor includes a proximal frame portion, attached to the harvester, a distal frame portion, hingedly connected to the proximal frame portion, the proximal and distal frame portions supporting a laterally flexible endless belt. The distal frame portion is pivotal in a generally horizontal plane. A biasing device is coupled between the proximal frame portion and the distal frame portion. The biasing device is configured to bias the distal frame portion toward longitudinal alignment with the proximal frame portion, and to resist horizontal deflection of the distal frame portion relative to the proximal frame portion.

In accordance with another aspect thereof, the present disclosure provides a shock-absorbing conveyor boom, having a proximal portion, a distal portion, hingedly connected to the proximal portion, the proximal and distal portions supporting a laterally flexible endless conveyor belt. The distal portion is pivotal in a generally horizontal plane, and is biased toward longitudinal alignment with the proximal portion, whereby physical shock applied to the distal portion can be absorbed by lateral deflection of the distal portion.

In accordance with another aspect thereof, the present disclosure provides a harvester, having an upwardly extending discharge conveyor having a proximal portion and a distal portion, and supporting a laterally flexible endless belt. The distal portion is hingedly attached to the proximal portion and pivotal in a generally horizontal plane. A biasing device is coupled between the proximal and distal portions, and is configured to bias the distal portion toward longitudinal alignment with the proximal portion, whereby physical shock applied to the distal portion can be absorbed by lateral deflection of the distal portion.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
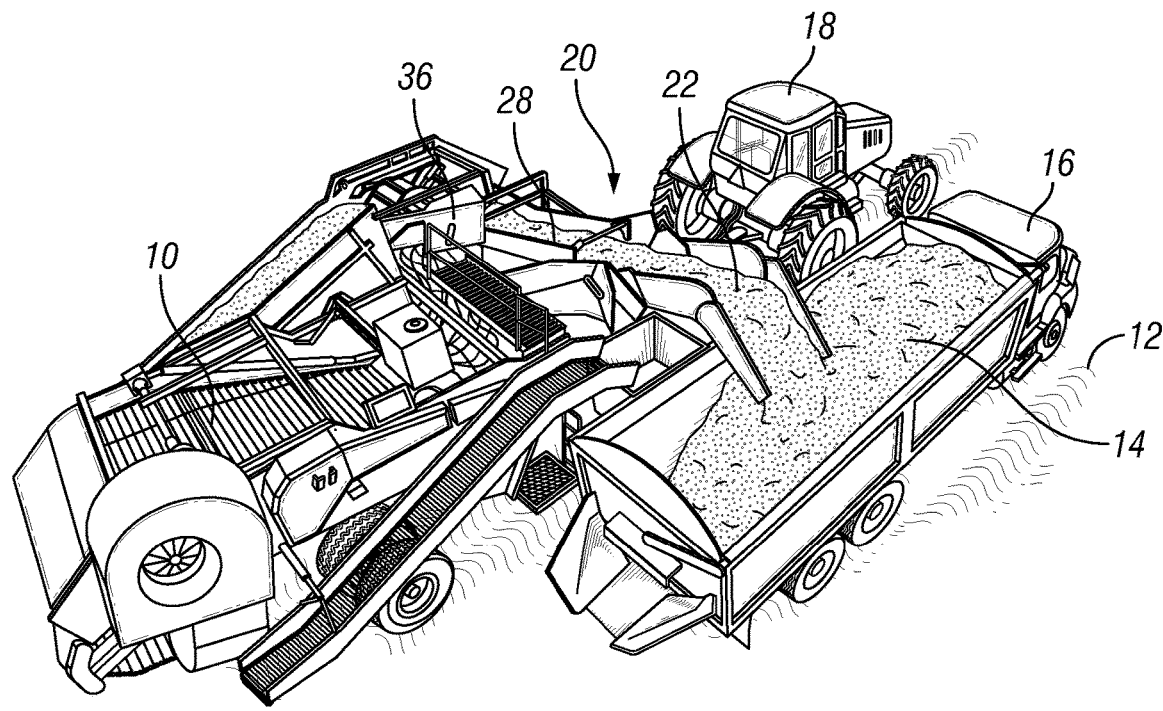
FIG. 1 is a perspective view of a harvester in use in a field harvesting and discharging agricultural products into a receiving vehicle via a discharge conveyor having a shock-absorbing boom in accordance with the present disclosure.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Shown in FIG. 1 is a perspective view of a harvester 10 in use in a field 12, harvesting and discharging agricultural products 14 into a receiving vehicle 16. The harvester 10 in this image is a potato harvester, towed by a tractor 18. It is to be appreciated that a variety of types of harvesters or other agricultural machines and a variety of types of towing vehicles, as well as self-propelled agricultural machines, can be used in this sort of operation, and the present disclosure is not limited to the specific configuration shown.

The harvester 10 includes an overhead boom 20 that supports a discharge conveyor 22, which transports and discharges the products 14 from the harvester 10 to a receiving vehicle 16, such as a truck, that moves along in the field 12 beside the harvester 10. As noted above, during this type of operation it is possible for the distal end 24 of the discharge conveyor boom 20 to be contacted by the receiving vehicle 16 if the receiving vehicle 16 and the harvester 10 are not moving at the same speed. This can damage the harvester 10 or cause other problems.

Figure 2:
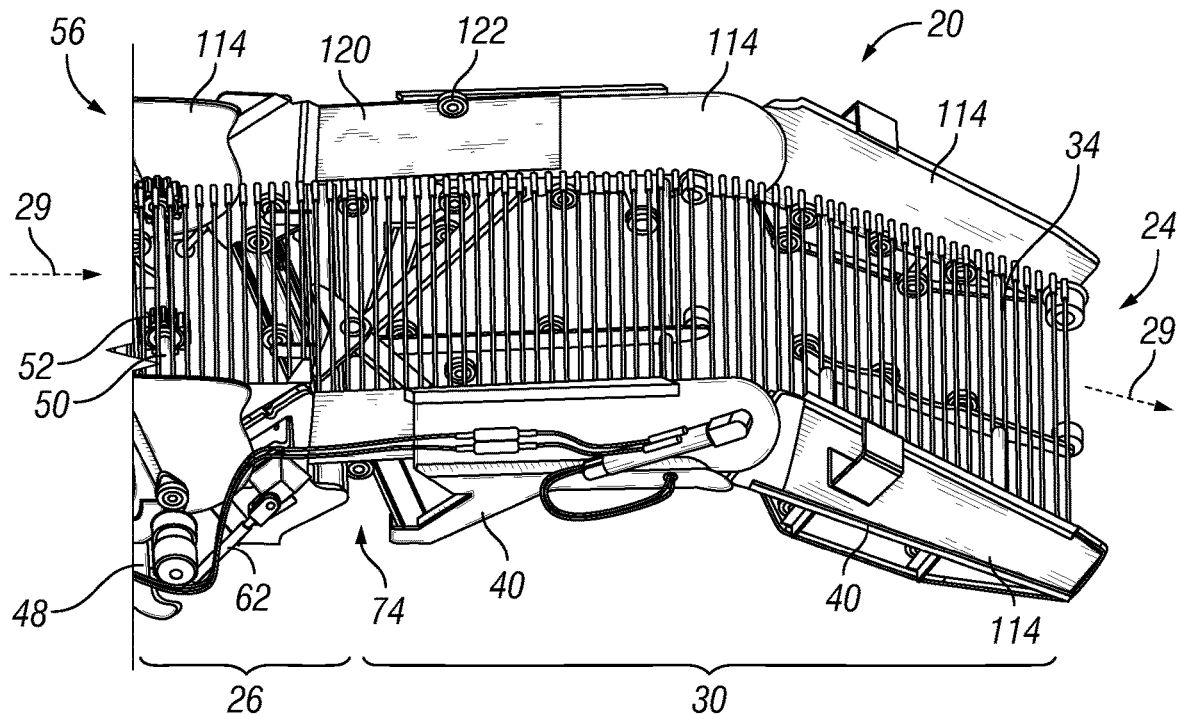
FIG. 2 is a close-up perspective view of the discharge conveyor of the harvester of FIG. 1.
Figure 5:
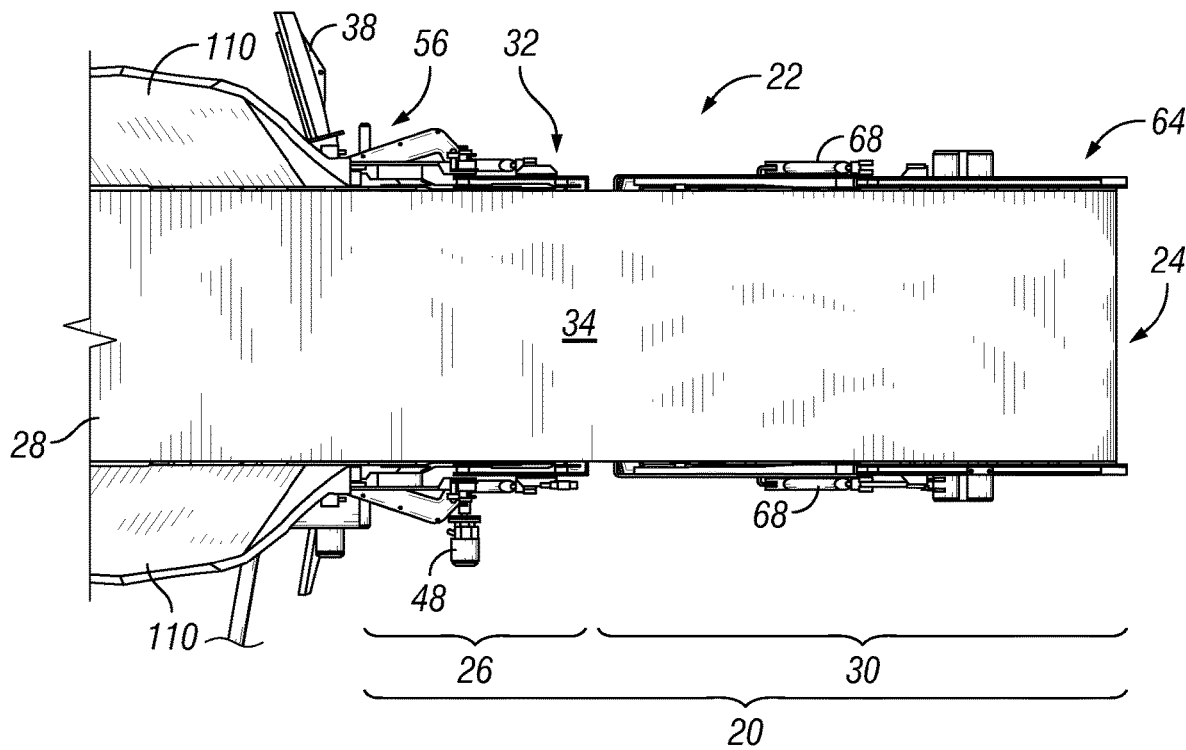
FIG. 5 is a top view of the discharge conveyor of FIG. 2.
Figure 6:
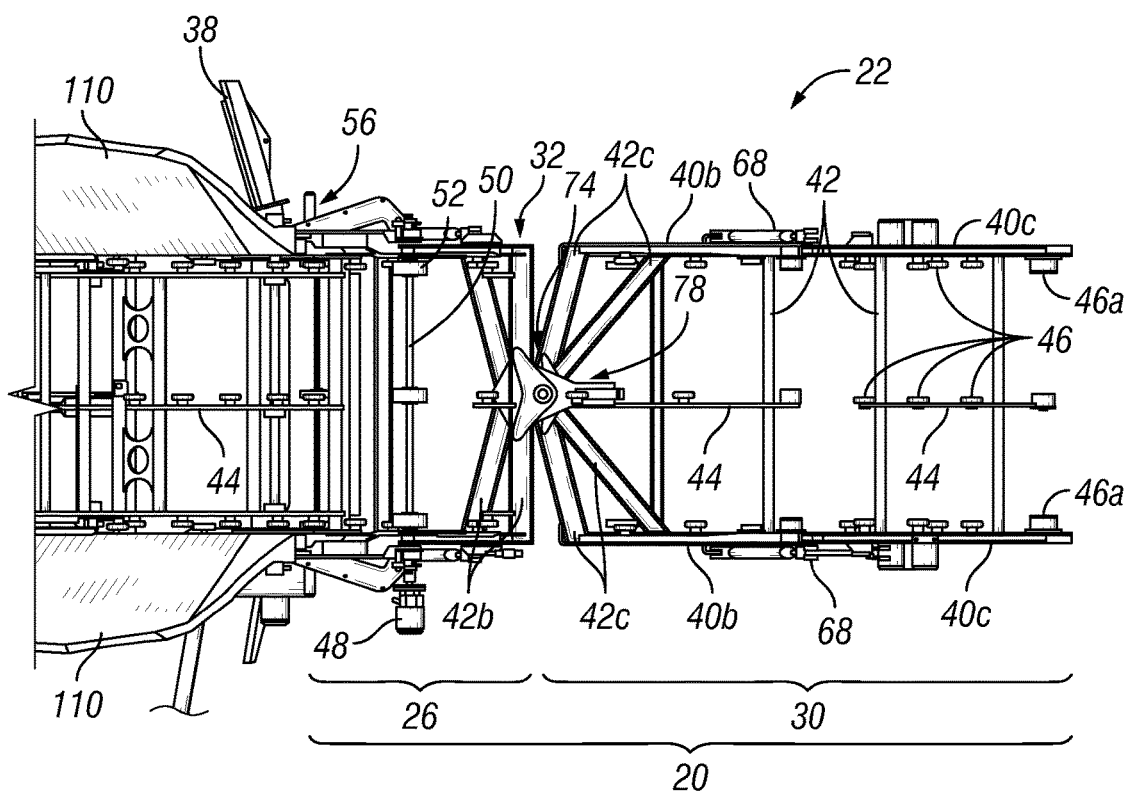
FIG. 6 is a top view of the discharge conveyor of FIG. 2 with the conveyor belt removed, showing the frame of the shock-absorbing boom.

Advantageously, the present disclosure provides a discharge conveyor having a shock-absorbing boom 20 that can withstand minor contact with a co-traveling vehicle 16 or other object without being significantly damaged and without interruption of its operation. Shown in FIG. 2 is a close-up perspective view of one embodiment of a discharge conveyor 22 that can be incorporated into a harvester 10 like that of FIG. 1, and which includes a shock-absorbing boom 20 in accordance with the present disclosure. Side and side cross-sectional views of the discharge conveyor 22 of FIG. 2 are provided in FIGS. 3 and 4, respectively, and top views of the same in its straight, undeflected configuration are shown in FIGS. 5 and 6.

The discharge conveyor 22 generally includes a proximal frame portion 26, which is attached to an inclined conveyor section 28 of the harvester 10, and a distal frame portion 30 that is attached to the distal end 32 of the proximal frame portion 26 and extends away from the harvester 10. The inclined conveyor section 28 and the proximal and distal frame portions 26, 30 of the discharge conveyor 22 together support a laterally flexible endless belt 34, such as a chain-type belt, which transports the harvested product 14 toward the distal end 24 of the discharge conveyor 22, in the direction indicated by arrows 29 in FIG. 2, where the product 14 can be discharged into the receiving vehicle 16. The inclined conveyor section 28 of the harvester 10 can be laterally pivotal, having a substantially vertical pivoting axis at its proximal end 36, and being supported on an arcuate roller bearing track 38 toward its distal end 56, so that the horizontal orientation of the inclined conveyor section 28 can be adjusted as desired.

The proximal and distal frame portions 26, 30 each generally include side frame members 40 interconnected by transverse frame members 42. The side frame members of the proximal frame portion are designated 40a, and the side frame members of the distal frame portion are designated 40b. Additional braces and other structural members are also provided for desired strength. Central frame bars 44, oriented parallel to the side frame members 40 and supported by the transverse frame members 42, are positioned between the respective side frame members 40. The central frame bars 44 and the side frame members 40 support a variety of idler rollers 46 that in turn support the endless belt 34, including idler rollers, return rollers, drive rollers, etc. A drive motor 48 (e.g. a hydraulic or electrical motor) is attached to the proximal frame portion 26, with a drive axle 50 extending transversely across the proximal frame portion 26, with drive sprockets 52 fixedly attached to the drive axle 50. The drive axle 50 and sprockets 52 are also shown clearly in FIG. 11. The drive sprockets 52 engage the transverse bars 54 of the endless belt 34, driving the belt 34 for operation of the discharge conveyor 22.

Figure 3:
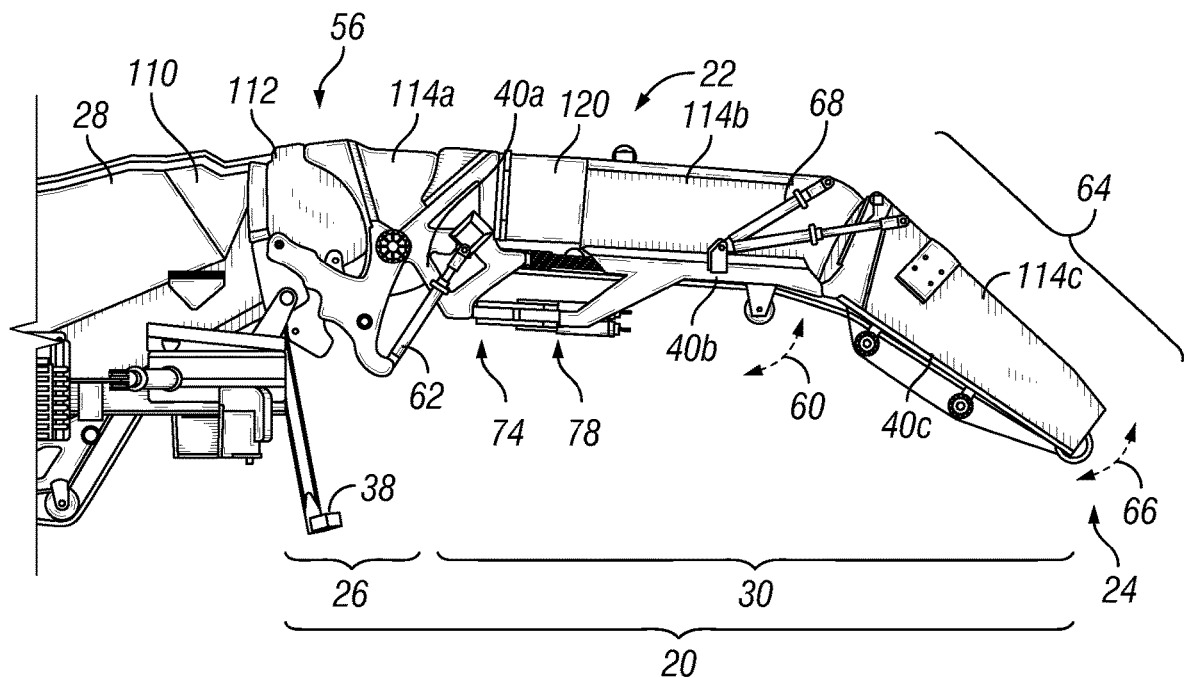
FIG. 3 is a side view of the discharge conveyor of FIG. 2.
Figure 4:
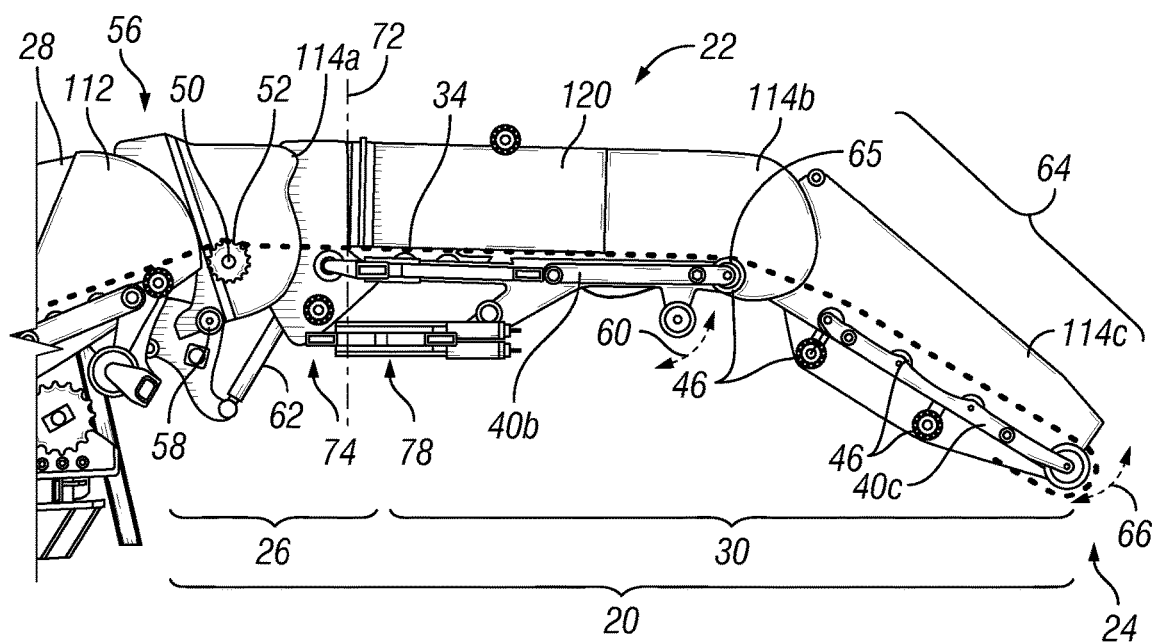
FIG. 4 is a side, cross-sectional view of the discharge conveyor of FIG. 2.

The side members 40a of the proximal frame portion 26 are pivotally attached to the distal end 56 of the inclined conveyor section 28 at a horizontal pivot point 58, allowing the distal end 32 of the proximal frame portion 26 to move in a vertical plane, so that the proximal and distal frame portions 26, 30 can be moved up and down, as indicated by arrows 60 in FIGS. 3 and 4. A pair of actuators 62 (e.g. hydraulic cylinders) are attached between the inclined conveyor section 28 and the proximal frame portion 26 to provide this motion.

In the embodiment shown in the figures the distal frame portion 30 also includes a tip-down 64 at its extreme distal end 24. The tip-down 64 is an additional conveyor frame portion with tip-down side members 40c, transverse frame members 42, a central bar 44, and rollers 46, including a set of return rollers 46a upon which the endless belt 34 experiences a complete reversal of direction, turning under the frame of the tip-down 64 and thereby discharging (e.g. propelling) the product 14 from the end of the belt 34. The side members 40c of the tip-down 64 are pivotally attached to the distal end of the distal frame portion 30 at a horizontal pivot point (65 in FIG. 4), allowing the distal end of the tip-down 64 to move in a vertical plane, so that the distal end 24 of the tip-down 64 (which is the distal end 24 of the discharge conveyor 22) can be moved up and down, as indicated by arrows 66 in FIGS. 3 and 4. A pair of actuators 68 (e.g. hydraulic cylinders) are attached between the distal frame portion 30 and the tip-down 64 to provide this motion. This provides an additional range of vertical adjustment of the discharge conveyor 22.

Figure 9:
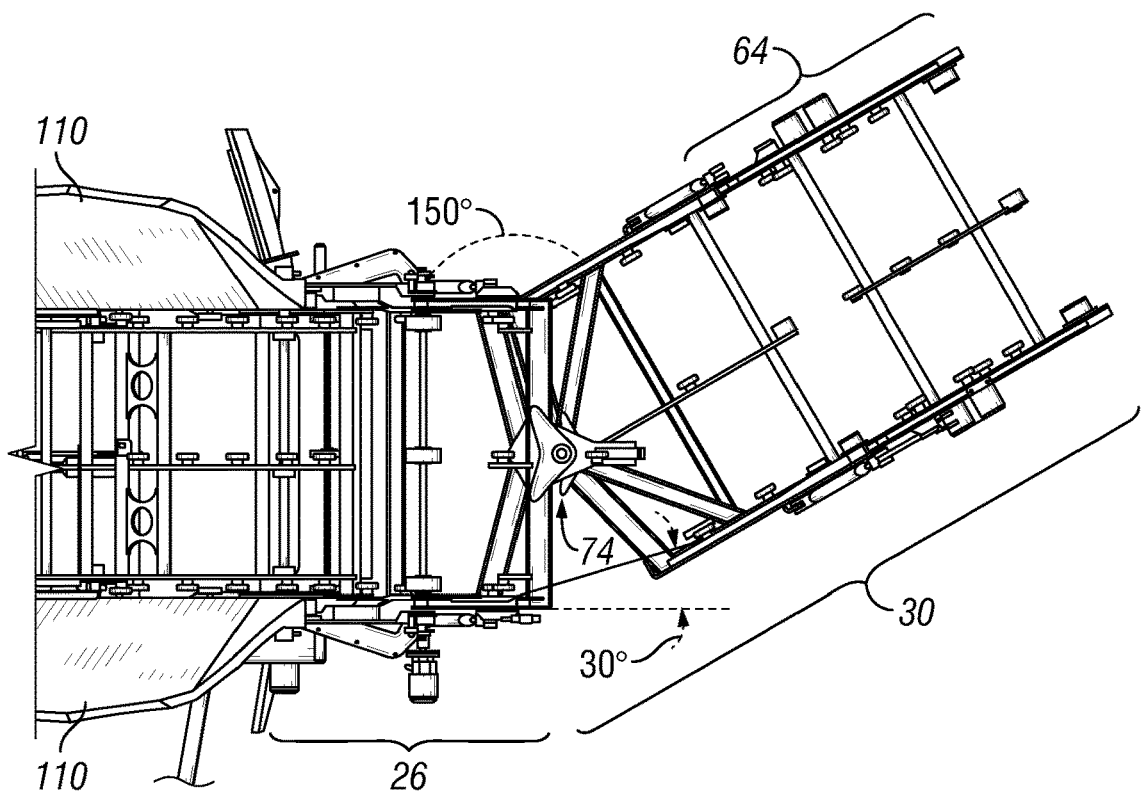
FIG. 9 is a top view like FIG. 6, showing the shock-absorbing boom fully deflected in a first direction.
Figure 10:
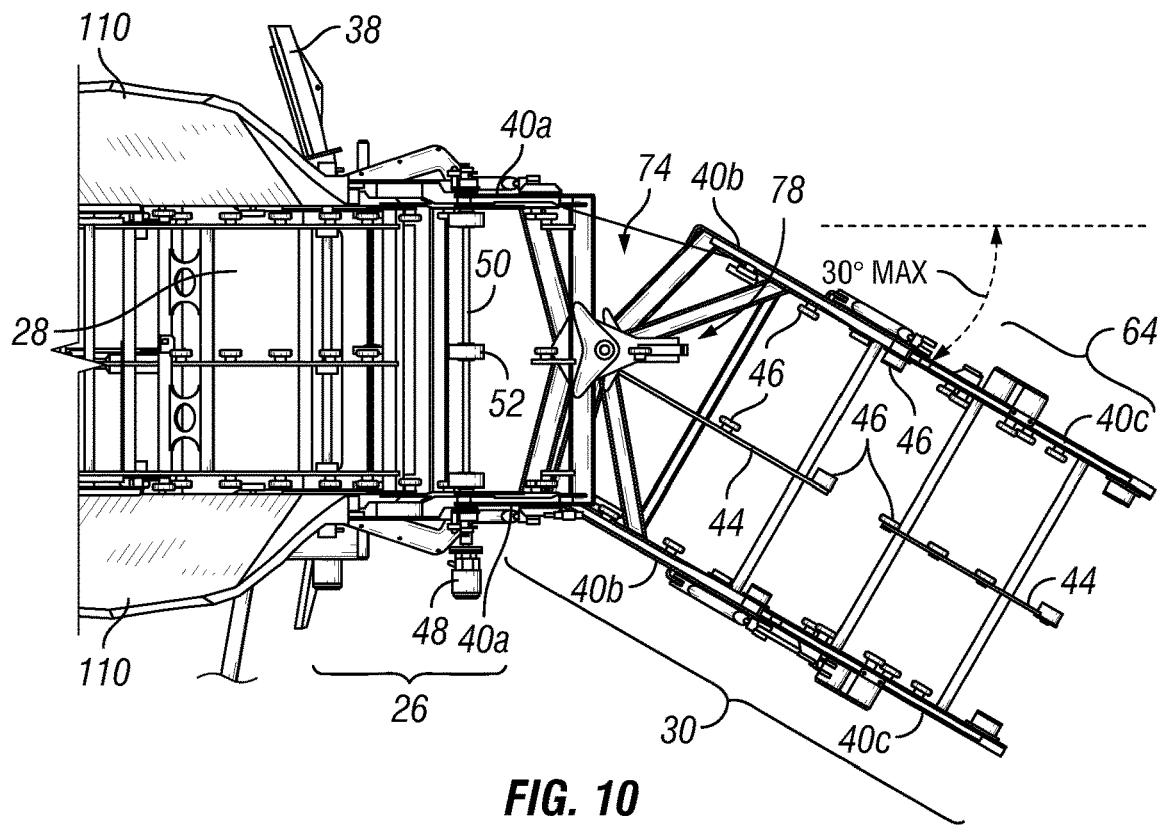
FIG. 10 is a top view like FIG. 6, showing the shock-absorbing boom fully deflected in a second direction.

The distal frame portion 30 is hingedly connected to the distal end 32 of the proximal frame portion 26 at a horizontal hinged connection, indicated generally at 74, having a generally upright (i.e. approximately vertical) pivoting axis, indicated at 72 in FIG. 4. As best seen in FIGS. 6 and 9-10, the proximal frame portion 26 includes one or more transverse distal end bars 42b, and the distal frame portion 30 likewise includes one or more transverse proximal end bars 42c. These end bars 42 of the proximal and distal frame portions 26, 30 are attached together with a hinge 74 having a generally vertical hinge pin 76, allowing the distal frame portion 30 to pivot in a generally horizontal plane relative to the proximal frame portion 26. It will be apparent that the verticality of the pivoting axis 72 (which is coincident with the long axis of the hinge pin 76) will vary depending upon the relative vertical angle of the proximal frame portion 26. When the proximal frame portion 26 is oriented such that the conveyor belt 34 thereupon is substantially horizontal, the hinge pin 76 and pivoting axis 72 will be substantially vertical.

The generally straight or longitudinally aligned configuration of the discharge conveyor 22 depicted in FIGS. 5 and 6 can be considered a default or neutral position of the discharge conveyor 22. In the top view of FIG. 5 the chain-type conveyor belt 34 is shown in place, while the top view of FIG. 6 shows the discharge conveyor 22 with the conveyor belt 34 removed. Because of this configuration, whenever the distal frame portion 30 (and/or the tip-down 64, which is a part of the distal frame portion 30) is contacted by an obstacle or some other structure, the distal frame portion 30 can pivot and deflect in a generally horizontal plane in response to that contact, thereby reducing potential damage to the discharge conveyor 22.

The range of horizontal pivoting of the distal frame portion 30 relative to the proximal portion 26 is determined by the dimensions and physical configuration of the respective frame portions. As can be seen in FIGS. 9 and 10, in the embodiment shown in the figures, the distal frame portion 30 can deflect up to about 30° in either direction relative to the longitudinal alignment. It is to be appreciated that this maximum deflection angle is only one of many possibilities for a shock-absorbing boom in accordance with the present disclosure, and a discharge conveyor like that shown herein could be configured with a different maximum deflection angle. In the embodiment shown herein, the deflection angle of the shock-absorbing boom 20 can be between 0° and 30°, depending on the magnitude of contact with some other object. For example, light contact may only move the boom a degree or two, while more severe contact can deflect the boom 20 to the 30° maximum deflection in the breakaway area. To help facilitate deflection, the transverse proximal end bars 42c of the distal frame portion 30 are oriented at an angle relative to the other transverse bars 42 to prevent or minimize mechanical conflicts when the distal portion 30 is deflected.

Disposed below the hinged connection of the proximal and distal portions 26, 30 is a biasing device, indicated generally at 78, which is coupled between the proximal frame portion 26 and the distal frame portion 30, and is configured to bias the distal frame portion 30 toward longitudinal alignment with the proximal frame portion 26. The biasing device 78 operates to resist horizontal deflection of the distal frame portion 30 relative to the proximal frame portion 26, yet allows horizontal deflection when there is sufficient force upon the end of the distal frame portion 30. The distal portion is thus biased toward longitudinal alignment with the proximal portion, whereby physical shock applied to the distal portion can be absorbed by lateral deflection of the distal portion.

Figure 7:
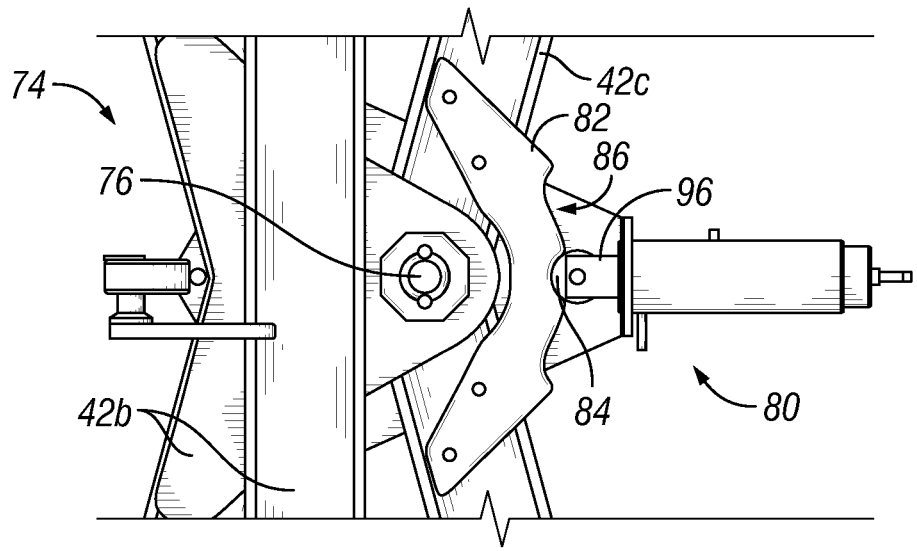
FIG. 7 is a close-up top view of the detent mechanism of the shock-absorbing boom in the neutral, undeflected position.
Figure 8:
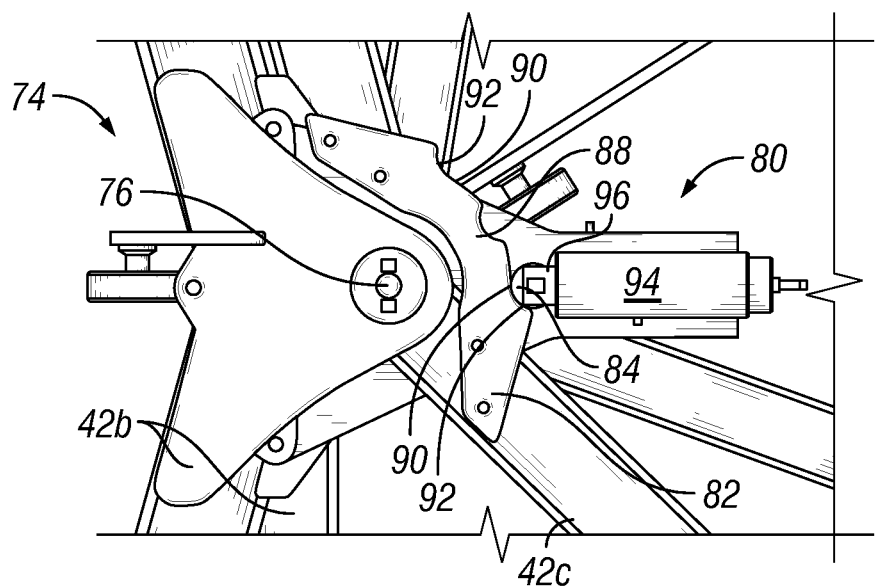
FIG. 8 is a close-up top view of the detent mechanism of the shock-absorbing boom in a fully deflected position.

The biasing device 78 can be configured in various ways. In the embodiment depicted herein, the biasing device 78 is a detent mechanism 80, the structure and operation of which are best seen in FIGS. 7 and 8. The detent mechanism 80 operates in a generally passive manner, and generally includes a cam member 82, fixedly attached to one or the other of the distal frame portion 30 or the proximal frame portion 26, and a biasing roller 84, fixedly attached to the other of the distal or proximal frame portions 26 or 30. In the embodiment shown in FIGS. 7 and 8 the cam member 82 is a curved cam bar, fixedly attached to a transverse proximal end bar 42c of the distal frame portion 30. The cam member 82 includes an arcuate cam surface 86, which has a central depression 88, with curved cam surfaces 90 extending away from each side of the central depression 88, and an end shoulder 92 at each extreme end of the cam member 82.

A biasing cylinder 94 is fixedly attached to a transverse end bar 42b of the proximal frame portion 26, and supports the biasing roller 84, which is disposed in rolling contact with the cam surface 86. The biasing cylinder 94 encloses a compression spring (not shown), and a roller shaft 96 extends from the biasing cylinder 94. The biasing roller 84 is attached to the roller shaft 96, and the force of the compression spring presses the roller 84 against the cam surface 86 so that deflection of the distal frame portion 30 causes rolling motion of the roller 84 along the cam surface 86. Because of the force of the compression spring and the shape of the cam surface 86, the detent mechanism 80 naturally provides a neutral position and biases the distal frame portion 30 toward this neutral position. Specifically, the biasing roller 84 is naturally pushed toward the central depression 88 of the cam surface 86, in which position the discharge conveyor 22 is generally longitudinally aligned (as in FIGS. 5 and 6). On the other hand, the end shoulders 92 of the cam surface 86 act as a mechanical stop against the roller 84, assisting in stopping additional deflection of the distal frame portion 30 beyond the desired mechanical limits discussed above.

It is to be understood that the passive detent mechanism 80 shown and described herein is only one type of biasing device 78 that can be used in connection with this discharge conveyor 22 disclosed herein. As other alternatives, the biasing device 78 can be a hydraulic or electrically actuated device that actively pushes the distal portion of the discharge conveyor 22 toward the neutral position, with sensors and other devices to detect contact or deflection. Other options can also be used, and the system disclosed herein is not limited to the specific detent mechanism 80 that is shown and described.

As noted above, the conveyor belt 34 employed in the discharge conveyor 22 disclosed herein is laterally flexible. This characteristic is desirable to allow the belt 34 to operate properly when the distal portion of the discharge conveyor 22 is laterally deflected in the manner described above. Those of skill in the art will be aware that conveyor belts, such as flexible rubberized belts, are generally flexible relative to their thin axis (i.e. the thickness of the belt), but are relatively inflexible relative to the wide axis of the belt (i.e. across the width of the belt), which makes them generally unable to curve laterally.

Figure 11:
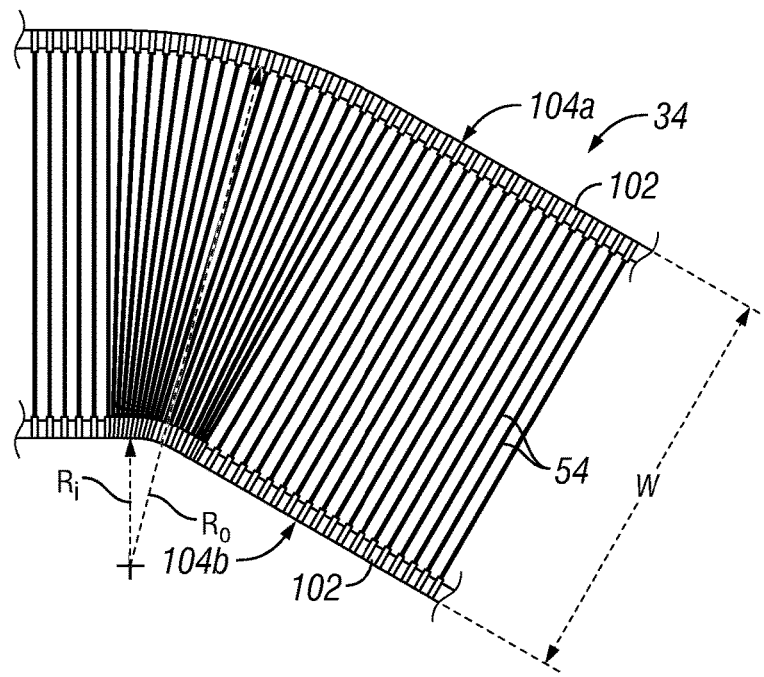
FIG. 11 is a top view of an embodiment of a chain belt that can be used with the shock-absorbing boom of the present disclosure, in a curved configuration.

Advantageously, the discharge conveyor 22 disclosed herein employs a chain-type belt 34 that is laterally flexible and can successfully navigate the lateral curve created when the distal end 24 of the discharge conveyor 22 is deflected. The lateral flexibility of the belt is specifically illustrated and described with reference to FIGS. 11 and 12. Shown in FIG. 11 is a top view of a chain-type belt 34 in a laterally curved configuration, as when the shock-absorbing boom deflects. The chain-type belt 34 shown in FIG. 11 includes a series of generally straight, parallel transverse bars 54, which are interconnected via flexible (e.g. rubber-type) longitudinal webbing 102 disposed at the lateral sides 104 of the belt, at the ends of the bars. In the embodiment shown, the bars 54 are about ½" diameter at a standard spacing of from 40 mm to 50 mm between bars, and the bars are about 42" to 48" long, the length of the bars defining the width W of the belt 34. It is to be appreciated that these dimensions are only one example, and chain-type belts of various sizes and configurations can be used with a discharge conveyor 22 as disclosed herein.

The view of FIG. 11 shows the change in the geometry of the belt 34 when the distal end 24 of the discharge conveyor 22 is deflected to its maximum limit, as in FIG. 10. As can be seen in this figure, the webbing 102 of the chain-type belt 34 can compress or fold up to allow adjacent bars 54 of the belt 34 to draw together where needed, thus allowing the belt 34 to laterally curve when the distal portion deflects. In doing so, the webbing 102 at the extreme outside lateral ends 104a of the bars is stretched to or remains at its full length, while the inner lateral ends 104b of the bars draw together, causing the webbing 102 to bunch up on the inside of the curve, as shown in FIG. 11. In one embodiment the belt 34 can laterally curve to effectively have an outer radius $R_o$ of about 67" and a minimum inner radius $R_i$ of about 20". Chain-type belts with other dimensions and curvature characteristics can also be used.

It is to be appreciated that the structural and geometric features of the belt 34 represent only one of many possible belt configurations that can be used with the discharge conveyor 22 of the present disclosure. For example, it will be apparent that the minimum radius of curvature $R_i$ of the belt 34 will vary depending on the width of the belt 34 and other factors.

Figure 12:
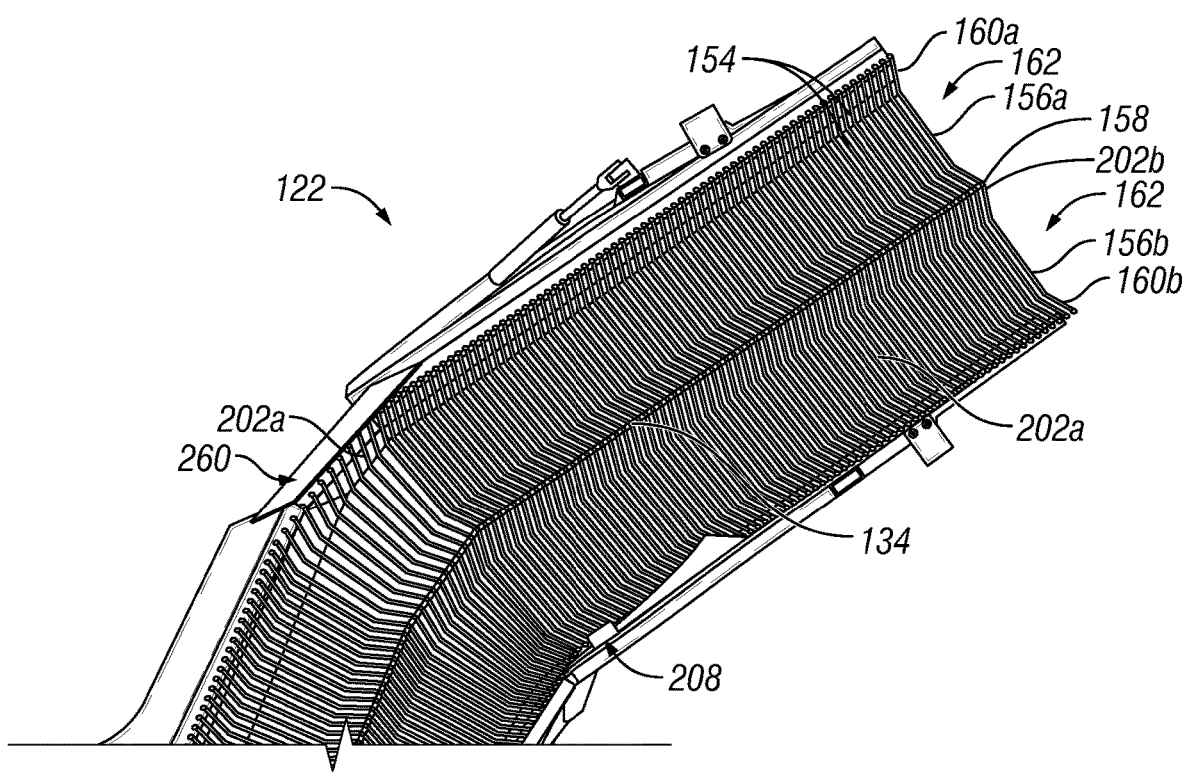
FIG. 12 is a top perspective view of a shock boom in a deflected position, bearing an alternative embodiment of a chain belt.
Figure 13:
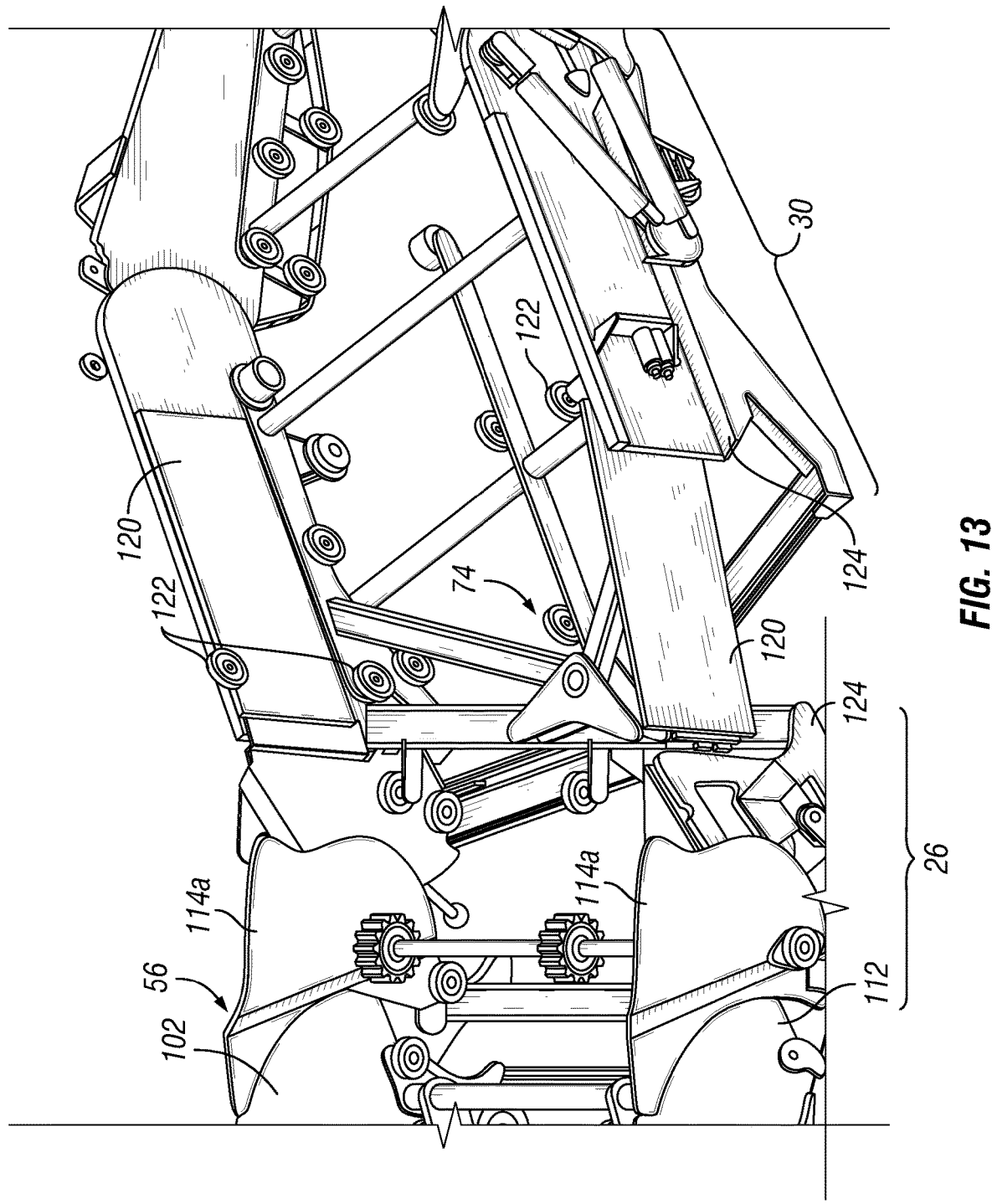
FIG. 13 is a perspective view of the discharge boom frame deflected in a first direction, showing the telescoping side panels in a first position.
Figure 14:
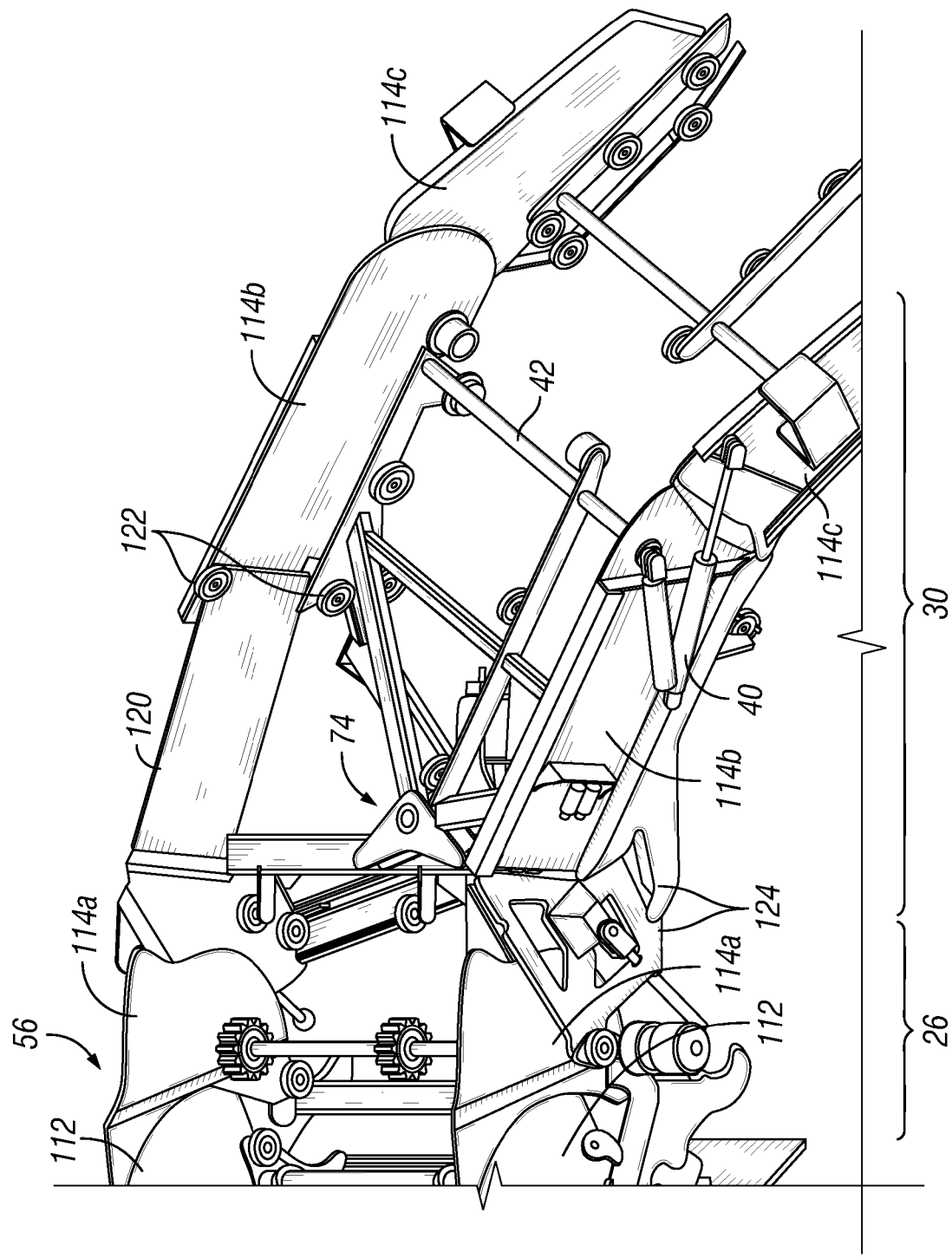
FIG. 14 is a perspective view of the discharge boom frame deflected in a second direction, showing the telescoping side panels in a second position.

Those of skill in the art will also appreciate that belts of different sizes, types and configurations can be used with a discharge conveyor as disclosed herein. For example, shown in FIG. 12 is a top perspective view of a discharge conveyor 122 in a deflected position, bearing a chain-type belt 134 having an elongated "W" shape. This chain-type belt 134 includes a series of generally parallel transverse bars 154 that each include first and second straight sections 156a, b, with an upwardly extending ridge portion 158 between the straight sections 156 at the central region of the bars 154, and upwardly extending end portions 160a, b at the opposing distal ends of the bars 154.

The bars 154 are interconnected by flexible longitudinal webbing 202 at three points across the width of the belt. Specifically, the lateral sides of the belts at opposing ends of the bars 154 are connected by flexible end webbing 202a, and the central ridge portion 158 of adjacent bars 154 are also interconnected by flexible central webbing 202b. This configuration provides a chain-type belt that effectively has two troughs, indicated at 162, on either side of a central ridge 158, the upwardly-extending end portions 160 forming side walls for the two troughs 162. This flattened or elongated "W" shaped configuration helps to hold product on the belt. As with the flat chain-type belt 34 shown in FIG. 11, the bars of the flattened "W" shaped belt of FIG. 12 can vary in their length, diameter and standard spacing, and can also vary in the dimensions of the central ridge 158 and end portions 160.

When the discharge conveyor 122 is deflected, as shown in FIG. 12, the longitudinal webbing 202 can compress or fold up to allow the belt 134 to laterally curve. In doing so, the webbing 202a at the extreme outside edge of the curve, indicated at 206, remains at its full length, while the inner lateral ends 204b of the bars draw together, and causing the end webbing 202a to bunch up on the inside of the curve, indicated at 208. Additionally, the central webbing 202b will also bunch up toward the inside of the curve, as the central ridge portion 158 of the bars draw together to navigate the curve.

Another advantageous feature of the discharge conveyor 22 of the present disclosure relates to the side panels of the conveyor. The discharge conveyor 22 disclosed herein includes upstanding side panels, disposed along lateral sides of the conveyor belt 34, which are configured to retain harvested products 14 upon the conveyor belt 34. As can be seen in FIGS. 1, 5-6, 9-10 and 12, the inclined conveyor section 28 of the harvester 10 includes outwardly flared side panels 110, which are generally solid and continuous almost up to the junction with the proximal frame portion 26 of the discharge conveyor 22. These flared side panels 110 help retain products 14 on the belt 34 as it is lifting the product 14 toward the discharge end 24 of the conveyor system 22.

On the other hand, referring to FIGS. 2-6 and 11-14, the inclined conveyor section 28 includes generally upright side panels 112 at its distal end 56, and the proximal and distal frame portions 26, 30 also include generally upright side panels 114 attached to their side frame members 40 along their lengths. The upright side panels 112 and 114 are interleaved and have a telescoping configuration, which allows relative movement of the various parts of the discharge conveyor 22. Specifically, the distal end 56 of the inclined conveyor section 28 includes generally upright side panels 112 with rounded distal ends 116, which interleave with the adjacent upright side panels 114a of the proximal frame portion 26, to accommodate the up and down pivoting adjustment of the proximal frame portion 26. The adjacent ends of the upright side panels 114a of the proximal frame portion 26 also have rounded ends 118 for the same reason. When the vertical angle of the proximal frame portion 26 is adjusted, the upright side panels 112 of the inclined conveyor section 28 and the upright side panels 114a of the proximal frame portion 26 slide past each other, effectively maintaining a continuous barrier along the sides of the conveyor belt 34.

A similar configuration is present at the junction of the tip-down 64 on the distal frame portion 30. The distal frame portion 30 includes generally upright side panels 114b interleaved with the adjacent upright side panels 114c of the tip-down 64, to accommodate the up and down pivoting movement of the tip-down 64. The adjacent ends of the upright side panels 114 of both the distal frame portion 30 and the tip-down 64 have rounded ends and are in physical sliding contact with each other, so that when the vertical angle of the tip-down 64 is adjusted relative to the distal frame portion 30, the upright side panels 114c of the tip-down 64 and the upright side panels 114b of the distal frame portion 30 slide past each other, effectively maintaining a continuous barrier along the sides of the conveyor belt 34.

The side panels 114 also include a side panel telescoping mechanism that is configured to extend and retract the side panels 114 in the region of the horizontal hinged connection 74 between the proximal frame portion 26 and the distal frame portion 30. The side panel telescoping mechanism is most clearly shown in FIGS. 13 and 14. The side panel telescoping mechanism includes a portion of the upstanding side panels 114a, b that are positioned near the hinged connection 74, and includes sliding side panels 120, disposed at opposing lateral sides of one of the distal or proximal frame portions 26, 30. A sliding side panel guide 122 is disposed at opposing lateral sides of another of the distal or proximal frame portions 26 or 30. The sliding side panels 120 are slidable in the respective sliding side panel guides 122 when the distal frame portion 30 horizontally deflects. The side panel telescoping mechanism thus extends and retracts the sliding side panels 120 in the region of the hinged connection 74 when the distal frame portion 30 laterally deflects.

The side panels 114 and their appurtenant structures also assist with defining the range of deflection of the shock-absorbing boom 20. Specifically, the upstanding side panels 114a, 114b on immediately opposite sides of the hinged connection 74 include upright frame members 124 associated with the opposing lateral frame members 40 of each of the proximal and distal frame portions 26, 30. The upright frame members 124 of the distal and proximal frame portions 26, 30 are configured to contact each other at an extreme maximum deflection position of the distal frame portion 30. It will be apparent that this function operates simultaneously with operation of the side panel telescoping mechanism. That is, full retraction of the telescoping side panels 120 on one side or the other of the hinged connection 74 will coincide with full deflection of the shock-absorbing boom 20, and thus will also coincide with contact of the upright frame members 124 of the distal and proximal frame portions 26, 30 at full deflection, and thus will further define the deflection limit of the distal frame portion 30.

The disclosure thus provides a harvester discharge conveyor boom 20 that can resist minor impacts or shocks without damage and without interruption of the harvesting operation. A pivoting hinge mechanism allows the distal end 24 of the discharge conveyor 22 to deflect up to about 30° horizontally in either direction from the normal straight alignment of the boom 20, thus allowing it to absorb shocks or impact and deflect, rather than being damaged. Advantageously, the pivot mechanism is biased toward the normal straight alignment, so that the boom 20 will naturally revert to the straight alignment after being deflected. The conveyor belt 34 can be a chain-type conveyor belt, which can compress along its inner lateral side edge, allowing it to flex laterally and curve with deflection of the distal frame 30 of the boom 20.

The disclosure can thus be interpreted to disclose a shock-absorbing conveyor boom, and to disclose a discharge conveyor for a harvester, and a harvester having a discharge conveyor with a shock-absorbing boom, as described herein. This device is useful for harvesters, such as root crop harvesters, as well as other agricultural machines, allowing lateral deflection to absorb impacts so as to minimize damage.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A discharge conveyor, comprising:
   a proximal frame portion, attachable to a harvester;
   a distal frame portion, hingedly connected to the proximal frame portion and pivotal in a generally horizontal plane, the proximal and distal frame portions supporting a laterally flexible endless belt; and
   a biasing device, coupled between the proximal frame portion and the distal frame portion, configured to bias the distal frame portion toward longitudinal alignment with the proximal frame portion, and to resist horizontal deflection of the distal frame portion relative to the proximal frame portion.

2. A discharge conveyor in accordance with claim 1, wherein the biasing device comprises a detent mechanism, coupled between the proximal and distal frame portions.

3. A discharge conveyor in accordance with claim 2, the detent mechanism further comprising
   a cam surface, fixedly attached to the distal frame portion; and
   a biased roller, fixedly attached to the proximal frame portion, disposed in rolling contact with the cam surface, deflection of the distal frame portion causing rolling motion of the biased roller along the cam surface.

4. A discharge conveyor in accordance with claim 1, wherein the distal frame portion has an extreme maximum deflection of about 30° in either direction relative to the longitudinal alignment.

5. A discharge conveyor in accordance with claim 1, wherein the distal frame portion further comprising a tip-down at an extreme distal end, the tip-down being selectively pivotal in a substantially vertical plane.

6. A discharge conveyor in accordance with claim 1, further comprising:
   upstanding side panels, disposed along lateral sides of the proximal and distal frame portions, configured to retain harvested products upon the discharge conveyor; and
   a side panel telescoping mechanism, comprising a portion of the upstanding side panels, positioned near the hinged connection of the proximal and distal frame portions, configured to extend and retract the side panels in the region of the hinged connection when the distal frame portion horizontally deflects.

7. A discharge conveyor in accordance with claim 6, wherein the side panel telescoping mechanism comprises:
   sliding side panels, disposed at opposing lateral sides of one of the distal or proximal frame portions; and
   a sliding side panel guide, disposed at opposing lateral sides of another of the distal or proximal frame portions, the sliding side panels being slidable in the sliding side panel guide when the distal frame portion horizontally deflects.

8. A discharge conveyor in accordance with claim 6, wherein the upstanding side panels include an upright frame member associated with the opposing lateral sides of each of the proximal and distal frame portions, the upright frame members of the distal and proximal frame portions being configured to contact each other at an extreme maximum deflection position of the distal frame portion.

9. A discharge conveyor in accordance with claim 1, wherein the laterally flexible endless belt comprises a chain-type belt, having a series of parallel transverse bars interconnected with flexible webbing at lateral ends of adjacent bars, the flexible webbing allowing lateral ends of adjacent bars to draw together on an inside of a lateral curve.

10. A discharge conveyor in accordance with claim 1, wherein the laterally flexible endless belt comprises a chain-type belt, having a series of parallel transverse bars with a flattened "W" configuration, the bars defining a pair of parallel troughs divided by a central ridge in the belt, the transverse bars being interconnected with flexible webbing at lateral ends of adjacent bars and along the central ridge, the flexible webbing allowing lateral ends of adjacent bars to draw together toward an inside region of a lateral curve.

11. A shock-absorbing conveyor boom, comprising:
    a proximal portion;
    a distal portion, hingedly connected to the proximal portion and pivotal in a generally horizontal plane, the proximal and distal portions supporting a laterally flexible endless conveyor belt; and
    the distal portion being biased toward longitudinal alignment with the proximal portion, whereby physical shock applied to the distal portion can be absorbed by lateral deflection of the distal portion.

12. A shock-absorbing conveyor boom in accordance with claim 11, wherein the distal portion can deflect up to about 30° in either direction relative to the longitudinal alignment.

13. A shock-absorbing conveyor boom in accordance with claim 11, further comprising a biasing mechanism, configured to bias the distal portion toward the longitudinal alignment, comprising
    a cam surface, fixedly attached to the distal portion; and
    a biased roller, fixedly attached to the proximal portion, disposed in rolling contact with the cam surface, deflection of the distal portion causing rolling motion of the biased roller along the cam surface.

14. A shock-absorbing conveyor boom in accordance with claim 11, further comprising:
    upstanding side panels, disposed along lateral sides of the proximal and distal portions, configured to retain harvested products upon the conveyor belt; and
    a telescoping side panel portion, positioned near the hinged connection of the proximal and distal portions, configured to extend and retract the side panels in the region of the hinged connection when the distal portion laterally deflects.

15. A shock-absorbing conveyor in accordance with claim 11, wherein full retraction of the telescoping side panel portions defines a deflection limit of the distal portion.

16. A harvester, comprising:
    an upwardly extending discharge conveyor having a proximal portion and a distal portion and supporting a laterally flexible endless belt;

the distal portion being hingedly attached to the proximal portion and pivotal in a generally horizontal plane; and a biasing device, coupled between the proximal and distal portions, configured to bias the distal portion toward longitudinal alignment with the proximal portion, and to resist horizontal deflection of the distal frame portion relative to the proximal frame portion.

17. A harvester in accordance with claim 16, wherein the distal portion can deflect up to about 30° in either direction relative to the longitudinal alignment.

18. A harvester in accordance with claim 16, further comprising:

upstanding side panels, disposed along lateral sides of the proximal and distal portions, configured to retain harvested products upon the conveyor belt; and a telescoping side panel portion, positioned near the hinged connection of the proximal and distal portions, configured to extend and retract the side panels in the region of the hinged connection when the distal portion laterally deflects.

19. A harvester in accordance with claim 16, wherein the laterally flexible endless belt comprises a chain-type belt, having a series of parallel transverse bars, interconnected with flexible webbing at lateral ends of adjacent bars, the flexible webbing allowing lateral ends of adjacent bars to draw together toward an inside of a lateral curve.

20. A harvester in accordance with claim 16, the distal portion further comprising a tip-down at an extreme distal end, the tip-down being selectively pivotal in a substantially vertical plane.

\* \* \* \* \*